United States Patent [19]

McMahon, Jr. et al.

[11] Patent Number: 4,573,171
[45] Date of Patent: Feb. 25, 1986

[54] SYNC DETECT CIRCUIT

[75] Inventors: Michael F. McMahon, Jr., Cedar Rapids; James M. Lavenz, Hiawatha, both of Iowa

[73] Assignee: Rockwell International Corporation, El Segundo, Calif.

[21] Appl. No.: 453,655

[22] Filed: Dec. 27, 1982

[51] Int. Cl.[4] ............................................. H04L 7/08
[52] U.S. Cl. ..................................... 375/114; 370/106
[58] Field of Search .................... 375/106, 114, 116; 371/46, 47; 370/100-108; 358/264

[56] References Cited

U.S. PATENT DOCUMENTS

| 3,597,547 | 8/1971 | Roll | 370/106 |
|---|---|---|---|
| 3,662,114 | 5/1972 | Clark | 370/106 |
| 4,131,763 | 12/1978 | Herschtal | 370/100 |
| 4,158,107 | 6/1979 | Nicholas | 370/100 |
| 4,161,719 | 7/1979 | Parikh et al. | 375/114 |
| 4,209,662 | 6/1980 | Steiner | 375/106 |
| 4,276,642 | 6/1981 | Siglow et al. | 370/106 |
| 4,298,987 | 11/1981 | Stattel et al. | 375/106 |
| 4,361,890 | 11/1982 | Green, Jr. et al. | 370/106 |

Primary Examiner—Marc E. Bookbinder
Assistant Examiner—Stephen Chin
Attorney, Agent, or Firm—Richard K. Robinson; George A. Montanye; H. Fredrick Hamann

[57] ABSTRACT

A sync detect circuit for detecting a sync code in a stream of digital data includes a counter that converts locally generated clock pulses to a plurality of discrete addresses that occur every bit period of time. The addresses are applied to a PROM which upon being addressed provides a sync verify code. The sync verify code is applied to a sync verify detector which provides an enable signal to the address generator if the code compares with the logic levels of a coincident bit in the stream of digital data provided from the PROM and after the full sync code has been rectified a sync detect signal is provided from a sync detector circuit.

7 Claims, 5 Drawing Figures

SYNC DETECT CIRCUIT

BACKGROUND OF THE INVENTION

This invention relates to circuits for detecting sync codes in a stream of digital data and, in particular, to sync detect circuits for two-stage sync codes.

The transmission of digital data and the accurate reception thereof requires the synchronization of local clocks or timing sources with the received data at the receiving station. Therefore, most transmissions of digital data have incorporated therein sync codes so that the receiving station may implement a synchronization operation upon detection of the sync code.

The synchronization codes used are often very complex and thus require an appropriate amount of complex circuitry for their proper detection, and in some cases the synchronization codes may be periodically changed to provide secured transmissions of the digital data.

SUMMARY OF THE INVENTION

A sync detect circuit for detecting a sync code in a stream of digital data includes a counter that converts locally generated clock pulses to a plurality of discrete addresses that occur every bit period of time. The addresses are applied to a PROM which upon being addressed provides a sync verify code. The sync verify code is applied to a sync verify detector which provides an enable signal to the address generator if the code compares with the logic levels of a coincident bit in the stream of digital data provided from the PROM and after the full sync code has been rectified a sync detect signal is provided from a sync detector circuit.

It is the object of the invention to provide a sync detect circuit that provides a bit by bit comparison of a preselected sync pattern.

It is another object of the invention to provide a sync detector circuit that compares only the third one-quarter of each bit of the incoming data and generates a clock synchronization procedure during the last twenty-five percent of the last bit of the sync pattern in the received data.

It is yet another object of the invention to provide a sync detector circuit which can be easily programmed to detect any of a variety of sync codes.

BRIEF DESCRIPTION OF THE DRAWINGS

In order that the invention may be readily carried into practice, a number of embodiments will now be described in detail by way of example, with reference to the accompanying drawings in which.

DETAILED DESCRIPTION OF THE PREFERRED EMBODIMENT

Figure 1:
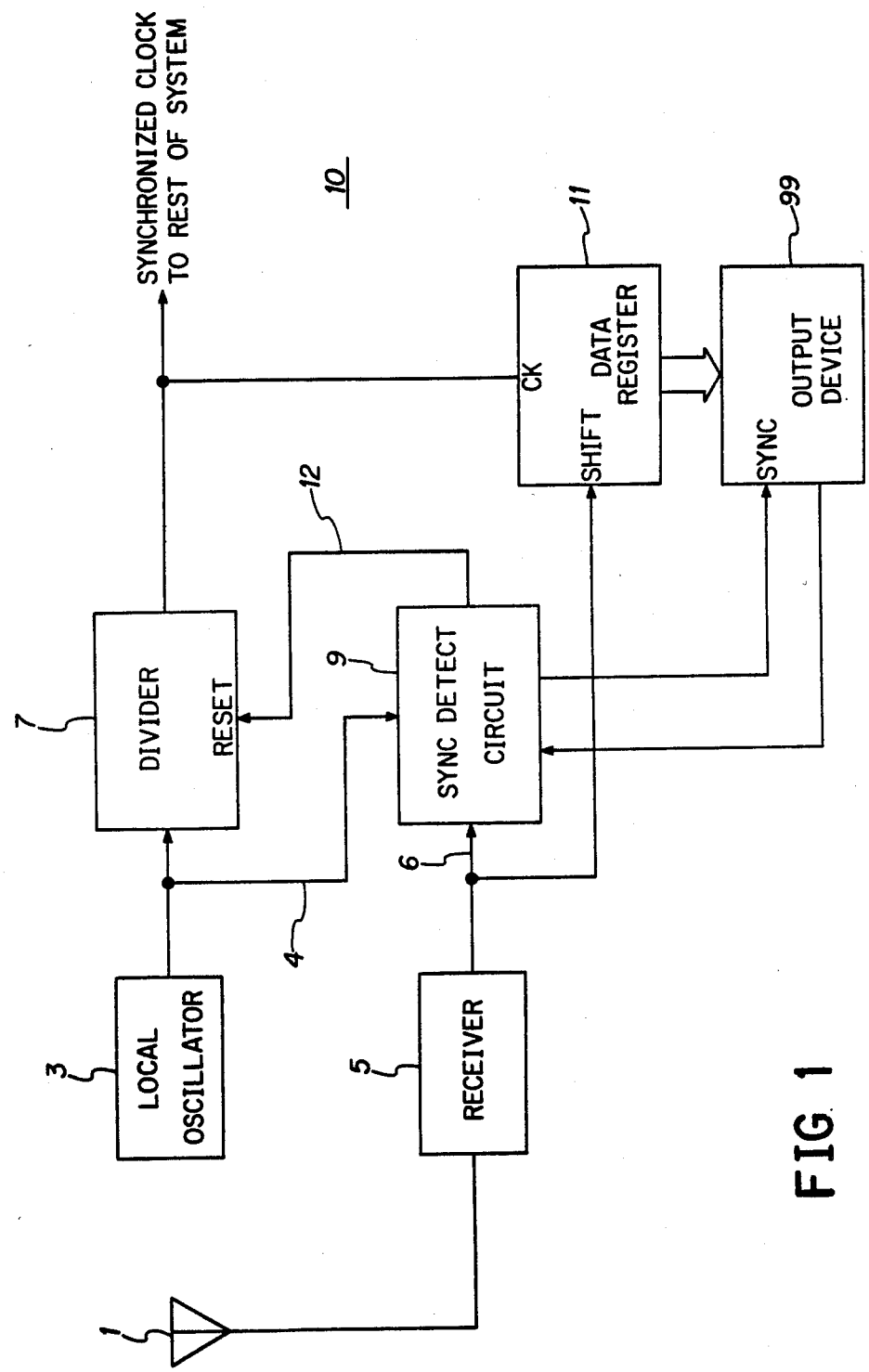
FIG. 1 is a block diagram of a radio receiver incorporating the sync detector circuit according to the invention.

FIG. 1, to which reference should now be made, illustrates a radio receiver 10 that has incorporated therein a sync detect circuit 9. A radio antenna 1 receives a transmission that contains encoded digital data. The digital data is demodulated by receiver 5 and applied to a sync detect circuit 9 as well as to a data register 11 which is a shift register that formats the data that is shifted into it into character codes, frames or data words depending on the number of stages in the data register 11. A local oscillator 3 provides clock pulses to the sync detect circuit 9 as well as to a divider 7 where the clock pulses are divided down to the bit rate and applied to the data register 11. The sync detect circuit 9 upon detection of a sync code that is contained within the stream of digital data that is provided after being demodulated from the receiver 5 will cause the divider 7 to divide down the output signal from the local oscillator to a clock frequency which is generally equal to the bit rate or a low multiple thereof. The divider 7 is synchronized by the sync detect circuit 9 when the sync detect circuit 9 applies a reset pulse to the divider 7 resetting it at the detection of the sync code and causing the synchronized clock to be provided to the data register 11 which then clocks in the demodulated data under the control of a synchronized clock. The data from the data shift register 11 is applied to an output device 99 which includes an output terminal plus different code detection circuits. The output device 99 is in sync with the data that is shifted into the data register 11 by a sync indication being provided it from the sync detect circuit 9. The output device 99 resets the sync detect circuit when it detects an end of message indication in the data transferred to it from the data register 11.

Figure 2:
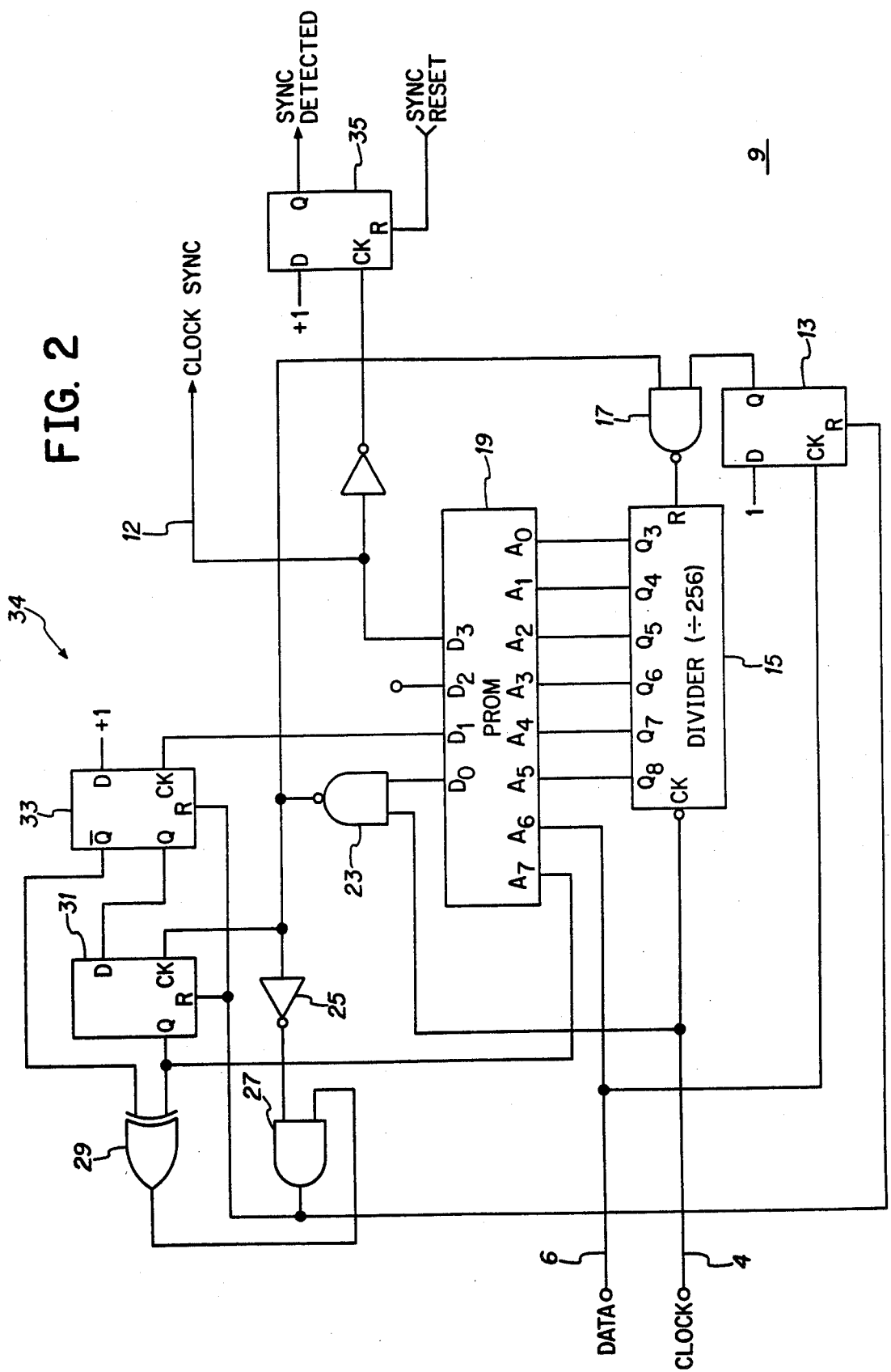
FIG. 2 is a schematic diagram of the sync detector code according to the invention.

FIG. 2, to which reference should now be made, is a schematic diagram of the sync detect circuit 9 of FIG. 1. The demodulated digital data is applied to the sync detect circuit 9 via conductor 6 where it is applied to a D flip-flop 13 that is triggered upon the first rising edge of the data to place a logic 1 on the Q terminal of the D flip-flop 13. Simultaneously with the application of the data to the clock terminal of the D flip-flop 13, the digital data is applied to a PROM 19 and in particular to the $A_6$ terminal which is the second most significant address bit of the PROM 19. The setting of the D flip-flop 13 places a logic 1 on the input of the NAND gate 17 which removes the reset from the divider 15. The clock, which in the case of the preferred embodiment is 160 kHz, is clocked into the divider 15 and is divided by 4 through 256 to address the PROM 19. Hence the divider 15 generates a portion of the addresses for the PROM 19. The PROM 19 converts the addresses that are provided by the divider 15 along with the data that is applied to the second most significant bit $A_6$ as well as feedback from a sync verify detector circuit 34 which is provided from the Q terminal of a D flip-flop 31 to the most significant bit $A_7$ of the PROM 19 into a sync verify code. The sync verify circuit 34 (including the D flip-flops 31, 33 as well as exclusive-OR gate 29, and the NAND gate 23, inverter 25 and AND gate 27) prevents both the D flip-flop 13 and the divider 15 from being reset until the sync is detected by a detector circuit that is provided by a sync detection through the proper addressing of the PROM 19. Upon detection of the sync, the divider 7 of FIG. 1 is reset via conductor 12 through the clock sync as well as a sync detect indication being provided from a D flip-flop 35 to the output device 99. The sync detected flip-flop 35 is reset, of course, by the output device providing a reset signal back to the sync detect circuit and this is generally provided upon the indication of an end-of-message detect signal.

The detection of the different sync codes and specification can readily be implemented by the programming of the PROM 19. One specific application is provided wherein the sync detect circuit 9 is programmed to detect a two stage sync code. The first stage is a stream of alternate logic zeros and logic ones with a detection requirement of detecting a minimum of six series of six logic 1 pulses alternated with six logic zero pulses. The second stage follows the first and requires the detection of eight logic zeros followed by two logic ones, or a a preselected time period followed by two logic ones. Table 1 provides the program that is stored within the PROM 19 which in the preferred embodiment is a 256×4 PROM used to detect the above referenced sync pattern.

of two logic zeros. This feature is useful for the transmission of multiple frames of data wherein during the compilation of the frames to be transmitted an alternate pattern of logic ones to logic zeros are transmitted. This is indicated by the filler bits 53 of waveform 41.

Each bit within the waveform 41 is checked during the third quarter of that bit. Terminal 19-$D_2$ provides an indication of the verify window that the sync detector 9 uses to check the data bits. This terminal is primarily used for synchronization of test equipment for trouble shooting of the sync detect circuit. After a minimum number of six alternate patterns of logic zero and logic ones have been detected and the absence of a logic 1 is detected as indicated at transition 55, the PROM 19 provides on its $D_0$ as represented by waveform 19-$D_0$, a pulse indication 57 which sets D flip-flop 31 and causes the exclusive-OR gate 29 to return to a logic 1 indication. This is represented by transition 59. Pulse 61 resets the divider 15 and the address sequence is reinitiated to time the length of time in which a logic zero or alternately the number of logic zeros is present on the wave-

TABLE 1

| Address | 00 | 10 | 20 | 30 | 40 | 50 | 60 | 70 | 80 | 70 | A0 | B0 | C0 | D0 | E0 | F0 |
|---|---|---|---|---|---|---|---|---|---|---|---|---|---|---|---|---|
| X0 | 0 | 0 | 0 | 0 | 0 | 0 | 0 | 2 | 6 | 6 | 7 | 7 | 7 | 7 | 6 | 7 |
| 1 | 0 | 0 | 0 | 2 | 0 | 0 | 0 | 2 | 6 | 6 | 7 | 7 | 7 | 7 | A | 7 |
| 2 | 5 | 5 | 5 | 7 | 4 | 4 | 4 | 6 | 6 | 6 | 7 | 7 | 7 | 7 | 7 | 7 |
| 3 | 0 | 0 | 0 | 2 | 0 | 0 | 0 | 2 | 6 | 6 | 7 | 7 | 7 | 7 | 7 | 7 |
| 4 | 0 | 0 | 0 | 2 | 0 | 0 | 0 | 2 | 6 | 6 | 7 | 7 | 7 | 7 | 7 | 7 |
| 5 | 0 | 0 | 0 | 2 | 0 | 0 | 0 | 2 | 6 | 6 | 7 | 7 | 7 | 7 | 7 | 7 |
| 6 | 4 | 4 | 4 | 6 | 5 | 5 | 5 | 7 | 6 | 6 | 7 | 7 | 7 | 7 | 7 | 7 |
| 7 | 0 | 0 | 0 | 2 | 0 | 0 | 0 | 2 | 6 | 6 | 7 | 7 | 7 | 7 | 7 | 7 |
| 8 | 0 | 0 | 0 | 2 | 0 | 0 | 0 | 2 | 6 | 6 | 7 | 7 | 7 | 7 | 7 | 7 |
| 9 | 0 | 0 | 0 | 2 | 0 | 0 | 0 | 2 | 6 | 2 | 7 | 7 | 7 | 2 | 7 | 7 |
| A | 5 | 5 | 5 | 7 | 4 | 4 | 4 | 6 | 6 | 2 | 7 | 7 | 7 | 2 | 7 | 7 |
| B | 0 | 0 | 0 | 2 | 0 | 0 | 0 | 2 | 6 | 2 | 7 | 7 | 7 | 2 | 7 | 7 |
| C | 0 | 0 | 0 | 2 | 0 | 0 | 0 | 2 | 6 | 7 | 7 | 7 | 7 | 6 | 7 | 7 |
| D | 0 | 0 | 0 | 2 | 0 | 0 | 0 | 2 | 6 | 7 | 7 | 7 | 7 | 6 | 7 | 7 |
| E | 4 | 4 | 4 | 6 | 5 | 5 | 5 | 7 | 6 | 7 | 7 | 7 | 7 | 6 | 7 | 7 |
| XF | 0 | 0 | 0 | 2 | 0 | 0 | 0 | 2 | 6 | 7 | 7 | 7 | 7 | 6 | 7 | 7 |
| | DATA = ∅ | | | | DATA = 1 | | | | DATA = ∅ | | | | DATA = 1 | | | |

Figure 3:
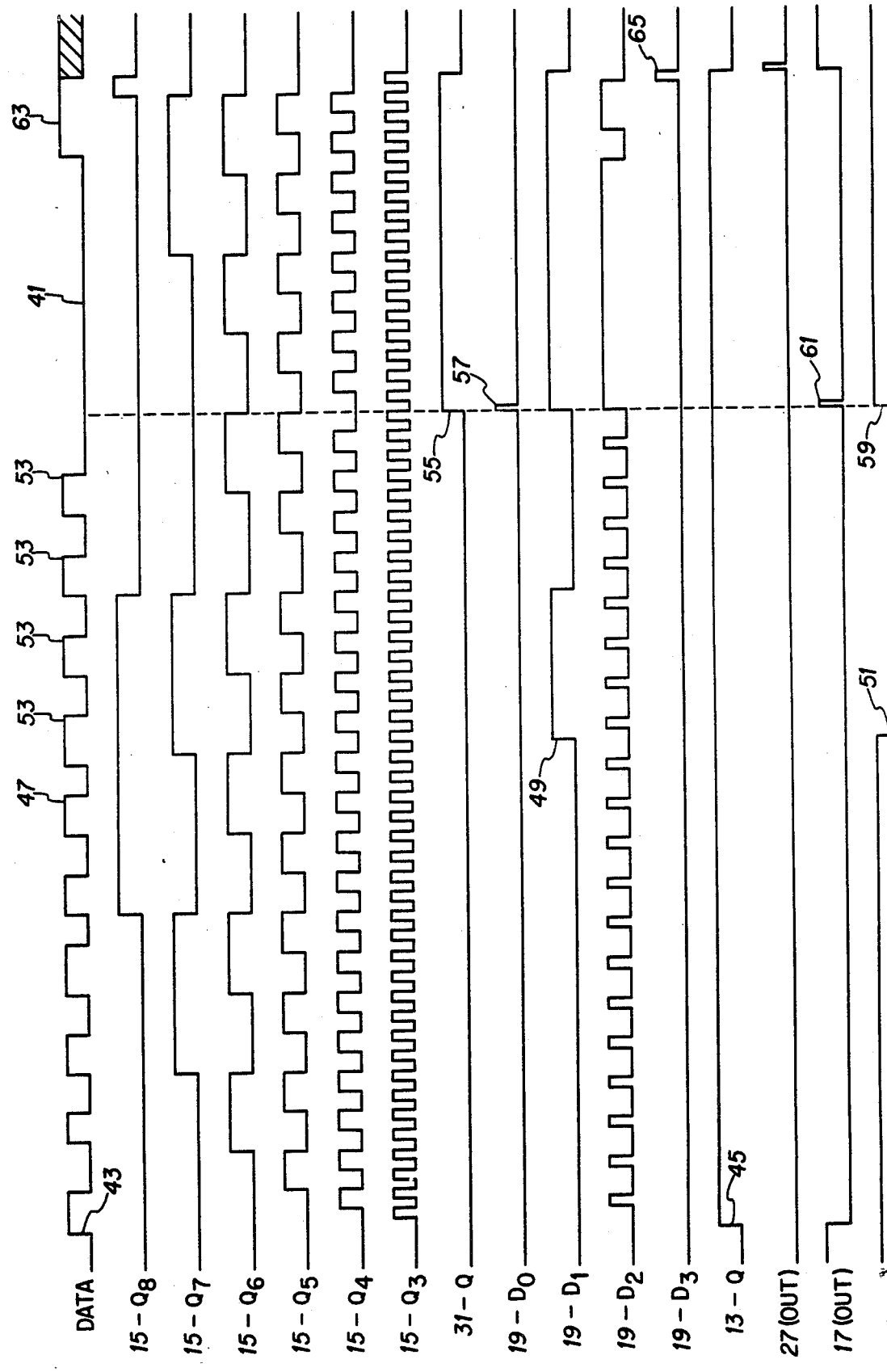
FIG. 3 is a timing diagram of the sync detector of FIG. 2 as programmed to detect a two-stage sync code.

FIG. 3, which should be used in conjunction with FIG. 2 as well as Table 1, is a timing diagram indicating the operation of the sync detect circuit 9 of FIG. 2 in which the waveform reference numerals correspond to the location in FIG. 2 from which the waveforms originate. Curve 41 is the sole exception to the above comment and indicates the digital data in which there is a plurality of logic 1 indications that alternate with logic zero indications. The width of the indications varies because the effect is encountered in the physical environment when noise conditions are presented. The sync detect circuit 9 is somewhat immune to noise because the moving edge of the data buses is used to look for sync conditions and the third quarter of each pulse is used for reference. Upon the detection of the first logic 1 indication 43 of the data curve 41, 13-Q goes from a logic zero to a logic 1 at transition 45. The presence of 13-Q enables the counter 15 which divides the clock pulses by 4 through 256. This division is represented by curves 15-$Q_3$ through 15-$Q_8$ respectively. Following the detection of the sixth logic 1 indication 47 of waveform 41, the 19-$D_1$ terminal provides a logic 1 indication at transition 49. This indication is used to clock the D flip-flop 33 placing a logic zero on the input of the exclusive-OR 29. Consequently, the exclusive-OR 29 changes from a logic 1 to a logic zero at the transition 49. This is indicated at transition 51. At this point the sync detect circuit may continue to detect the alternating patterns of logic zero and logic 1 until the detection form 41. The setting of D flip-flop 31 also places a logic one on the most significant bit $A_7$ of the PROM 19 which converts the PROM from the alternate logic zero and logic 1 pattern to the timed logic zero pattern. At the last quarter of the last bit 63 of waveform 41, which in the embodiment illustrated is logic one, a sync detected signal is detected by the PROM 19 through the operation of its eight bit address code and a sync detect signal is provided on terminal 19-$D_3$ as represented in that waveform by pulse 65. The pulse 65 causes the clock to be reset and synchronized through the action of the sync pulses being applied to the divider 7 via conductor 12. Additionally, the same sync pulse also sets the D flip-flop 35 which provides the sync detect indication to the output device 99.

Figure 4:
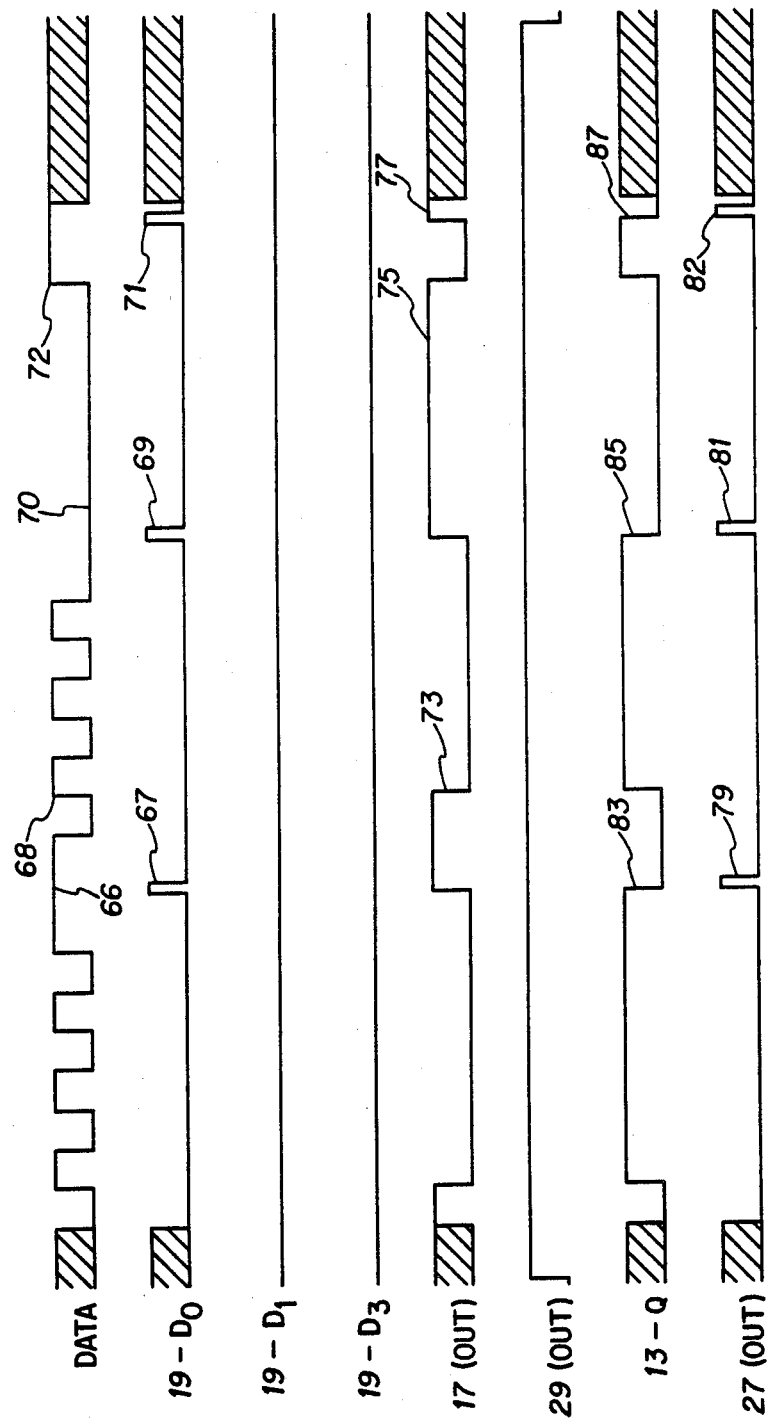
FIG. 4 is a timing diagram illustrating the operation of the sync detector circuit of FIG. 2 upon the detection of an error in the first stage of the sync code of FIG. 3.

In the situation where there are not six alternate patterns of logic zeros and ones provided, then the sync detect signal will not be verified. This is illustrated in FIG. 4 in which the data has an error at the bit indicated at 66. The output of the PROM 19 at the $D_0$ terminal is a pulse 67 which is applied to the NAND-gate 23. The output of the NAND-gate 23 resets the divider 15 and the D flip-flop 13 which will not be set until the next pulse 68 in the digital data waveform 41. Because of the error at point 66 the divider 15 at location 70, provides an address to the PROM which indicates that there should be a logic one at the location 70. In the absence of a logic one at location 70 a pulse 69 is provided on the $D_0$ terminal which again will cause the divider 15 to be reset as well as the D flip-flop 13 and this action prevents the divider from sequencing through its addresses even though the clock is being applied to the clock terminal of the divider 15. Additionally, the output of the AND gate 27 resets the D flip-flop 31 which prevents either the pulse 67 or 69 from setting this flip-flop. At transition 72 there is again a logic one indication in waveform 41 and the D flip-flop 13 is set as indicated by pulse 87 removing the reset from the divider 15. However, again at the second half of the bit 72 the sync detect circuit expects a logic zero instead of a logic one and consequently there is another error detected and indicated by pulse 71 and the system is again reset by pulse 82 which is indicated by 17 (out) signal as well as pulse 87 of waveform 13-Q. This message will be lost due to the fact that an improper sync code was detected by the sync detect circuit. This indication, of course, was caused by an error in the sync code at point 66.

Figure 5:
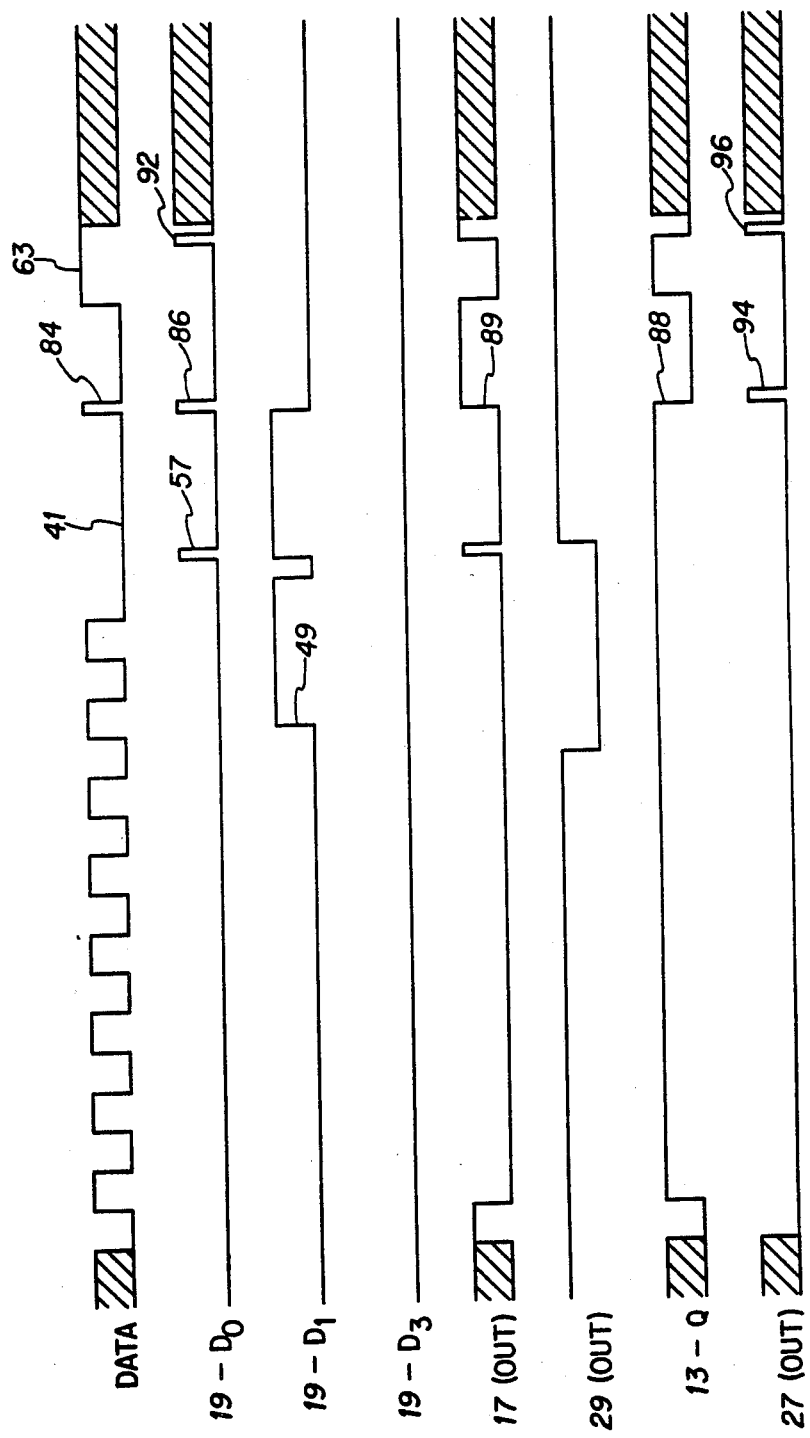
FIG. 5 is a timing diagram illustrating the operation of the sync detector of FIG. 2 when there is an error detected in the second stage of a two-stage sync code of FIG. 3.

In FIG. 5, to which reference should now be made, there is provided an illustration of the operation of the sync detect circuit 9 when an error in the second stage of the sync code is detected, essentially during the logic zero transmission stage. This occurs in FIG. 5 because of a glitch 84 in waveform 41. Although, as indicated by transition 49, that six alternate patterns of logic zeros and logic ones have been detected, and as indicated by pulse 57 in waveform 19-$D_0$ a second logic zero is detected in waveform 41. The glitch 84 will cause a pulse 86 to be provided on the output terminal $D_0$ of the PROM 19 which will reset the D flip-flop 13 as indicated in waveform 13-Q at transition 88 which resets the counter 15 at transition 89 of waveform 17 (out). This error will prevent the generation of the sync detect signal on the terminal 19-$D_3$ because of the glitch 84 and the sync detect circuit 9 is reset by the pulse 92 in waveform 19-$D_0$ which is indicated by the transition 96. However, because of the glitch 84 the message in which the sync detect code was contained will be discarded because of a possible error in the transmission. Again the unit is reset by the output of AND-gate 27 at point 94 and again at point 96.

Although the present invention has been described with respect to a particular embodiment thereof, it is not to be so limited as changes might be made therein which fall within the invention as defined in the appended claims.

We claim:

1. A synchronization detection system for detecting a synchronization code in a stream of digital data comprising:
   means for receiving a stream of digital data including a coded synchronization portion having first and second code segments;
   means responsive to the receipt of said digital data stream for generating a selected synchronization verification code having first and second segments representing a predetermined synchronization code, said means for generating a selected synchronization verification code including,
      means responsive to said digital data stream for providing a first enable signal,
      means for generating a plurality of addresses, said means for generating a plurality of addresses being responsive to a selected first enable signal and second enable signal,
      means responsive to said generated addresses for providing said synchronization verification code,
      means responsive to correspondence between a first segment of a coded synchronization portion in said digital data stream and a first segment of said synchronization verification code for providing said second enable signal, and
      means responsive to said second enable signal for initiating said comparison of the second segment of said coded synchonization portion and said second segment of said synchonization verification code; and
   means responsive to said digital data stream having a coded synchronization portion having first and second segments which are identical to said first and second segments of said synchronization verification code for generating a synchronization signal.

2. A synchronization detection system for detecting a synchronization code in a stream of digital data comprising:
   means for receiving a stream of digital data including a coded synchronization portion having first and second code segments, said first segment being formed as a plurality of digitally coded bits and said second segment being formed as time related digital data wherein said second segment is represented as a selected logic state transmitted for a fixed period of time followed by a second logic state;
   means responsive to the receipt of said digital data stream for generating a selected synchronization verification code having first and second segments representing a predetermined synchronization code; and
   means responsive to a coded synchronization portion of said stream of digital data having first and second segments which are identical to said first and second segments of said synchronization verification code for generating a synchronization signal, said means for generating a synchronization signal including,
      means for detecting an error in said first segment of said coded synchronization portion, and
      means for detecting an error in said second segment of said coded synchronization portion including,
         means for receiving clock pulses,
         means responsive to said clock pulses for generating a time period, and
         means responsive to a detection of said second logic state during said time period for providing an error signal.

3. A synchronization detection system for detecting a synchronization code in a stream of digital data comprising:
   means for receiving a stream of digital data including a coded synchronization portion having first and second code segments, said first segment being formed as a plurality of digitally coded bits wherein said first segment comprises a plurality of alternating first and second logic states and said second segment being formed as time related digital data;
   means responsive to the receipt of said digital data stream for generating a selected synchronization verification code having first and second segments representing a predetermined synchronization code; and
   means responsive to a coded synchronization portion of said stream of digital data having first and second segments which are identical to said first and second segments of said synchronization verification code for generating a synchronization signal, said means for generating a synchronization signal including:
  means for detecting an error in said first segment of said coded synchronization portion including,
    means responsive to a predetermined number of said alternate first and second logic states for providing a detection signal, and
    means responsive to said detection signal for initiating a detection of said second segment; and
  means for detecting an error in said second segment of said coded synchronization portion.

4. A synchronization technique for detecting a synchronization code in a stream of digital data comprising:
  receiving a stream of digital data including a coded synchronization portion having first and second code segments wherein said first segment is formed as a plurality of digitally coded bits and said second segment is formed as time related digital data wherein said second segment is represented as a selected logic state transmitted for a fixed period of time followed by a second logic state;
  generating a selected synchronization verification code having first and second segments representing a predetermined synchronization code in response to the receipt of said stream of digital data; and
  generating a synchronization signal in response to a coded synchronization portion of said stream of digital data having first and second segments which are identical to said first and second segments of said synchronization verification code wherein said step of generating a synchronization signal includes,
    detecting an error in said first segment of said coded synchronization portion, and
    detecting an error in said second segment of said coded synchronization portion including the steps of,
      receiving clock pulses,
      generating a time period in response to said clock pulses, and
      providing an error signal in response to a detection of said second logic state during said time period.

5. The system of claim 1 further comprising:
  means for providing a stream of clock pulses; and
  means for providing an output of divided clock pulses in response to said synchronization signal.

6. The system of claim 5 further comprising means responsive to said divided clock pulses and said synchronization signal for providing an output of said stream of digital data.

7. The technique of claim 4 wherein said first segment is represented as a plurality of alternating first and second logic states, and wherein said step of detecting an error in said first segment comprises:
  providing a detection signal in response to a predetermined number of said alternating first and second logic states; and
  initiating a detection of said second segment of the coded synchronization portion in response to said detection signal.

* * * * *